US009769323B2

(12) United States Patent
Tubi et al.

(10) Patent No.: US 9,769,323 B2
(45) Date of Patent: Sep. 19, 2017

(54) TECHNIQUES FOR ZERO RATING THROUGH REDIRECTION

(71) Applicant: Facebook, Inc., Menlo Park, CA (US)

(72) Inventors: Lior Tubi, Tel Aviv (IL); Dekel Schmuel Naar, Tel Aviv (IL); Roi Tiger, Tel Aviv (IL); Guy Rosen, Sunnyvale, CA (US); Joshua Ryan Lauer, San Francisco, CA (US); Xiaoliang Wei, Palo Alto, CA (US)

(73) Assignee: FACEBOOK, INC., Menlo Park, CA (US)

( * ) Notice: Subject to any disclaimer, the term of this patent is extended or adjusted under 35 U.S.C. 154(b) by 0 days.

(21) Appl. No.: 14/707,891

(22) Filed: May 8, 2015

(65) Prior Publication Data

US 2016/0261750 A1    Sep. 8, 2016

Related U.S. Application Data

(60) Provisional application No. 62/127,268, filed on Mar. 2, 2015, provisional application No. 62/127,251, filed
(Continued)

(51) Int. Cl.
*H04M 11/00* (2006.01)
*H04M 15/00* (2006.01)
(Continued)

(52) U.S. Cl.
CPC ............ *H04M 15/39* (2013.01); *H04L 67/02* (2013.01); *H04L 67/146* (2013.01);
(Continued)

(58) Field of Classification Search
CPC ............ H04L 61/1511; H04L 67/2866; H04L 61/301; H04L 67/02; H04L 67/146; H04M 15/39; H04W 12/08
(Continued)

(56) References Cited

U.S. PATENT DOCUMENTS 7,310,516 B1 * 12/2007 Vacanti ................ G06Q 10/087
455/414.1
7,606,745 B1    10/2009 Brumfield et al.
(Continued)

OTHER PUBLICATIONS

Office Action received for U.S. Appl. No. 14/707,903, mailed Mar. 9, 2016, 18 pages.
(Continued)

*Primary Examiner* — Babar Sarwar

(57) ABSTRACT

Techniques for zero rating through redirection are described. In one embodiment, an apparatus may comprise a client proxy component operative to receive a proxy network packet from a local gateway application on a client device, the proxy network packet containing an application network packet for delivery to a network server device; and forward the application network packet to the network server device based on a determination that a local user application is authorized to use the proxy server device; and a proxy access component operative on the processor circuit to determine that the application network packet is associated with the local user application on the client device; and determine that the local user application is authorized to use the proxy server device. Other embodiments are described and claimed.

17 Claims, 13 Drawing Sheets

Related U.S. Application Data on Mar. 2, 2015, provisional application No. 62/127,271, filed on Mar. 2, 2015.

(51) Int. Cl.
 *H04L 29/08* (2006.01)
 *H04W 12/08* (2009.01)
 *H04L 29/12* (2006.01)

(52) U.S. Cl.
 CPC ......... *H04L 67/2866* (2013.01); *H04W 12/08* (2013.01); *H04L 61/1511* (2013.01); *H04L 61/301* (2013.01)

(58) Field of Classification Search
 USPC ........... 455/405–411, 412.1–414.2, 418–420, 455/552.1, 422.1, 456.1; 709/218, 223, 709/233, 217, 219, 203, 224
 See application file for complete search history.

(56) References Cited

U.S. PATENT DOCUMENTS

| | | | |
|---|---|---|---|
| 8,024,567 B2 | 9/2011 | Han | |
| 8,234,373 B1* | 7/2012 | Ulvenes | G06Q 30/0283 455/406 |
| 2002/0107701 A1* | 8/2002 | Batty | G06Q 20/102 705/40 |
| 2008/0060064 A1* | 3/2008 | Wynn | H04L 63/062 726/5 |
| 2009/0125719 A1* | 5/2009 | Cochran | G06Q 30/02 713/171 |
| 2009/0187575 A1* | 7/2009 | DaCosta | G06Q 30/06 |
| 2011/0044334 A1* | 2/2011 | Miyashita | H04L 63/08 370/389 |
| 2012/0017161 A1* | 1/2012 | Hirshberg | G06F 3/04886 715/763 |
| 2012/0064858 A1 | 3/2012 | Cai et al. | |
| 2013/0067085 A1* | 3/2013 | Hershko | H04L 61/157 709/225 |
| 2013/0067086 A1* | 3/2013 | Hershko | H04L 61/157 709/225 |
| 2013/0103498 A1* | 4/2013 | Wei | G06Q 10/10 705/14.55 |
| 2013/0111560 A1* | 5/2013 | Arenas | H04L 67/16 726/4 |
| 2013/0125222 A1* | 5/2013 | Pravetz | H04L 67/22 726/6 |
| 2014/0033019 A1 | 1/2014 | Zhang et al. | |
| 2014/0295791 A1 | 10/2014 | Cai et al. | |
| 2015/0011180 A1 | 1/2015 | Buonomo et al. | |
| 2015/0341505 A1 | 11/2015 | Rivera et al. | |
| 2016/0142375 A1* | 5/2016 | Tubi | H04L 63/0281 726/1 |

OTHER PUBLICATIONS

Notice of Allowance received for U.S. Appl. No. 14/707,903, mailed Feb. 21, 2017, 15 pages.

* cited by examiner

*700*

Receive, at a network interface on a proxy server device, a proxy network packet from a local gateway application on a client device, the proxy network packet containing an application network packet for delivery to a network server device.
702

Determine that the application network packet is associated with a local user application on the client device.
704

Determine that the local user application is authorized to use the proxy server device.
706

Determine the application network packet to the network server device based on the determination that the local user application is authorized to use the proxy server device.
708

Receive, at a network interface on a web transform server device, a web request from a client device, the web request for a web page hosted on a network server device.
802

Retrieve the web page from the network server device.
804

Identify one or more non-zero-rated resource references in the retrieved web page.
806

Transform the one or more non-zero-rated resource references to form one or more zero-rated resource references.
808

Replace the one or more non-zero-rated resource references with the one or more zero-rated resource references in the web page to form a zero-rating transformed web page.
810

Transmit the zero-rating transformed web page to the client device in response to the web request.
812

*FIG. 8*

TECHNIQUES FOR ZERO RATING THROUGH REDIRECTION

RELATED APPLICATIONS

This application claims priority to U.S. Provisional Patent Application 62/127,268, "Techniques for Zero Rating Through Redirection and Web Reconstruction," filed Mar. 2, 2015, the entirety of which is incorporated herein by reference.

This application claims priority to U.S. Provisional Patent Application 62/127,251, "Techniques to Identify Applications Based on Network Traffic," filed Mar. 2, 2015, the entirety of which is incorporated herein by reference.

This application claims priority to U.S. Provisional Patent Application 62/127,271, "Techniques to Identify Application Foreground/Background State Based on Network Traffic," filed Mar. 2, 2015, the entirety of which is incorporated herein by reference.

This application is related to U.S. patent application Ser. No. 14/574,524, titled "Techniques for Contextual Mobile Data Access," filed Dec. 18, 2014, the entirety of which is incorporated herein by reference.

BACKGROUND

Cellular carriers may provide cellular data communication to their cellular customers. For example, smart phones and other mobile devices may run web browsers that may be used while on the cellular network to retrieve web pages. Additionally, many applications that may be pre-installed or user-installed on a mobile device may use cellular data communication to access remote data, such as resources available on the Internet. Some of these applications may use web requests—requests conforming to the hypertext transport protocol (HTTP) or related protocols, such as the hypertext transport protocol secure (HTTPS)—for their data access, even for data access distinct from conventional web access. For example, a social networking application may present a customized smart phone interface for use of a social network and use HTTP or HTTPS requests to retrieve the data presented on the customized smart phone interface.

Cellular carriers may not provide any or unlimited free cellular data communication to their cellular customers. Instead, cellular customers may be charged for bandwidth that they use on the carrier's cellular network. However, some cellular access may be "zero rated." Zero-rated cellular access may not contribute to capped free cellular data communication that may be included in a cellular customer's plan or pre-paid purchase. Zero-rated cellular access may not generate a fee to the cellular customer, even if that customer is over a limited quantity of allocated or pre-paid cellular data access, or where such an allocated or pre-paid cellular data access does not exist. Zero-rated cellular access may be dependent on the specific network accessed, with the cellular carrier having a list of one or more network addresses—such as internet protocol (IP) addresses—to which cellular customers have zero-rated access. This list may vary between cellular carriers.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques for zero rating through redirection and web reconstruction. Some embodiments are particularly directed to techniques to zero rate the cellular data traffic of mobile applications through redirection to zero-rated proxy servers and techniques to zero rate the cellular data traffic of mobile web browsers through reconstruction of web pages without reconfiguration of the mobile applications or mobile web browsers.

In one embodiment, for example, an apparatus may comprise a processor circuit on a proxy server device; a network interface on the proxy server device; a client proxy component operative on the processor circuit to receive, from the network interface, a proxy network packet from a local gateway application on a client device, the proxy network packet containing an application network packet for delivery to a network server device; and forward the application network packet to the network server device based on a determination that a local user application is authorized to use the proxy server device; and a proxy access component operative on the processor circuit to determine that the application network packet is associated with the local user application on the client device; and determine that the local user application is authorized to use the proxy server device.

In another embodiment, for example, an apparatus may comprise a processor circuit on a web transform server device; a network interface on the web transform server device; a client access component operative on the processor circuit to receive, from the network interface, a web request from a client device, the web request for a web page hosted on a network server device; and transmit a zero-rating transformed web page to the client device in response to the web request; and a web reconstruction component operative on the processor circuit to retrieve the web page from the network server device; identify one or more non-zero-rated resource references in the retrieved web page; transform the one or more non-zero-rated resource references to form one or more zero-rated resource references; and replace the one or more non-zero-rated resource references with the one or more zero-rated resource references in the web page to form the zero-rating transformed web page.

Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 7 illustrates an embodiment of a first logic flow for the system of FIG. 1.

FIG. 8 illustrates an embodiment of a second logic flow for the system of FIG. 1.

DETAILED DESCRIPTION

Figure 1:
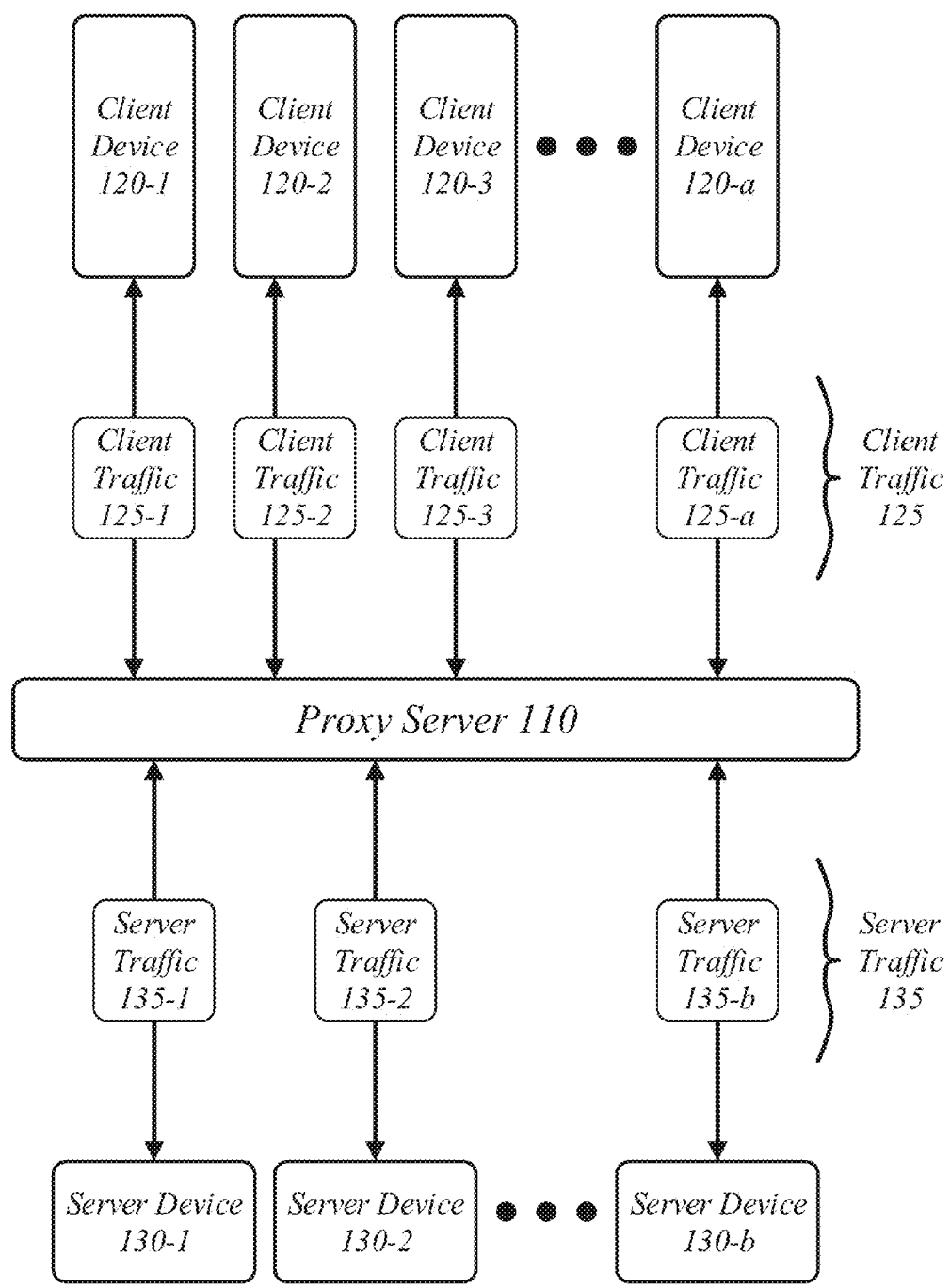
FIG. 1 illustrates an embodiment of a network environment for a zero-rating redirection system.

Various embodiments are directed to selectively zero-rating cellular data traffic generated by applications on mobile devices. A server may be zero-rated with a cellular provider. As such, traffic sent through the server to non-zero-rated servers may be zero-rated for a cellular customer. However, the cellular provider may zero-rate the server as part of an agreement with the operator of the zero-rated server making the use of the server conditional upon the purchase of a zero-rated data package for particular applications. As such, only those particular applications—which applications may vary for different cellular customers—may be authorized to use the zero-rated server.

The techniques for zero-rating data traffic may vary according to the type of mobile application being granted access to a zero-rated server. Some techniques may be directed to applications that are associated with one or more pools of servers with a defined list of domain names that they will access during legitimate activity. Some techniques may be directed to empowering any network activity by an application. As such, various embodiments can improve the affordability of using mobile applications on cellular data networks and improve the modularity of the cellular data offerings of cellular providers.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

It is worthy to note that "a" and "b" and "c" and similar designators as used herein are intended to be variables representing any positive integer. Thus, for example, if an implementation sets a value for a=5, then a complete set of components 122 illustrated as components 122-1 through 122-a may include components 122-1, 122-2, 122-3, 122-4 and 122-5. The embodiments are not limited in this context.

FIG. 1 illustrates a block diagram for a zero-rating redirection system 100. In one embodiment, the zero-rating redirection system 100 may comprise a computer-implemented system having software applications comprising one or more components. Although the zero-rating redirection system 100 shown in FIG. 1 has a limited number of elements in a certain topology, it may be appreciated that the zero-rating redirection system 100 may include more or less elements in alternate topologies as desired for a given implementation.

A proxy server 110 may be interposed in a network between client devices 120 and server devices 130. Client devices 120 may exchange network traffic with the server devices 130, both sending data to and receiving data from server devices 130. The proxy server 110 may act as an intermediary between the client devices 120 and the server devices 130 for these exchanges. The proxy server 110 may exchange client traffic 125 with the client devices 120 and exchange server traffic 135 with the server devices 130 while acting as an intermediary.

The proxy server may receive client traffic 125-1 from a client device 120-1 and transmit the client traffic 125-1 to server device 130-1 as server traffic 135-1. In some embodiments, server traffic 135-1 may be identical in content to client traffic 125-1, such as a duplication of client traffic 125-1 as received by the proxy server 110 retransmitted to the server device 130-1. In other embodiments, client traffic 125-1 may be modified in the production of server traffic 135-1, such that the server traffic 135-1 transmitted to the server device 130-1 is a modification of the client traffic 125-1 received at the proxy server 110. The client traffic 125-1 may be modified for the production of server traffic 135-1 so as to aid the client device 120-1 and/or server device 130-1 in their communication with each other and in the performance of their respective tasks.

The proxy server may receive server traffic 135-1 from a server device 130-1 and transmit the server traffic 135-1 to client device 120-1 as client traffic 125-1. In some embodiments, client traffic 125-1 may be identical in content to server traffic 135-1, such as a duplication of server traffic 135-1 as received by the proxy server 110 retransmitted to the client device 120-1. In other embodiments, server traffic 135-1 may be modified in the production of client traffic 125-1, such that the client traffic 125-1 transmitted to the client device 120-1 is a modification of the server traffic 135-1 received at the proxy server 110. The server traffic 135-1 may be modified for the production of client traffic 125-1 so as to aid the client device 120-1 and/or server device 130-1 in their communication with each other and in the performance of their respective tasks.

The proxy server 110 may selectively forward client traffic 125 to the server devices 130 and may selectively forward server traffic 135 to the client devices 120. The selectivity may be based on the cellular data plans associated with each of the client devices 120 and whether the network traffic, including both client traffic 125 and server traffic 135, is authorized to be zero-rated by the cellular data plans. Determining whether network traffic is authorized to be zero-rated by include monitoring and analyzing the network traffic. As such, the proxy server 110 may extract elements of the client traffic 125 and server traffic 135 and perform analysis on it. Further, the proxy server 110 may receive information regarding the activities of the client devices 120, server devices 130, and the users of the client devices 120 from either or both of the client devices and server devices 130. The proxy server 110 may perform analysis on the client traffic 125 and server traffic 135 and on the monitored elements of the client traffic 125 and server traffic 135. Alternatively, analysis may be performed by a separate device from the proxy server 110 with the proxy server 110 performing monitoring and extracting of elements of the network traffic, transferring the logged information to the separate device for analysis.

Exchanging and monitoring network traffic, such as client traffic 125 and server traffic 125, may comprise receiving network traffic exchanged via a network interface controller (NIC). A NIC comprises a hardware component connecting a computer device to a computer network. The NIC may be associated with a software network interface empowering software applications to access and use the NIC. Network traffic may be received over the computer network as signals transmitted over data links. The network traffic may be received by capturing these signals and interpreting them. The NIC may receive network traffic over the computer network and transfer the network traffic to memory storage accessible to software applications using a network interface application programming interface (API). The network traffic transferred to memory storage may be analyzed, with various elements extracted for use in machine learning and app recognition.

Zero-rating redirection system 100 may include an authorization server (or other suitable component(s)) that allows users to opt in to or opt out of having their actions monitored by zero-rating redirection system 100 or shared with other systems (e.g., third-party systems), for example, by setting appropriate privacy settings. A privacy setting of a user may determine what information associated with the user may be monitored and logged, how information associated with the user may be monitored and logged, when information associated with the user may be monitored and logged, who may monitor and log information associated with the user, whom information associated with the user may be shared with, and for what purposes information associated with the user may be logged or shared. Authorization servers or other authorization components may be used to enforce one or more privacy settings of the users of proxy server 110 through blocking, data hashing, anonymization, or other suitable techniques as appropriate.

Figure 2:
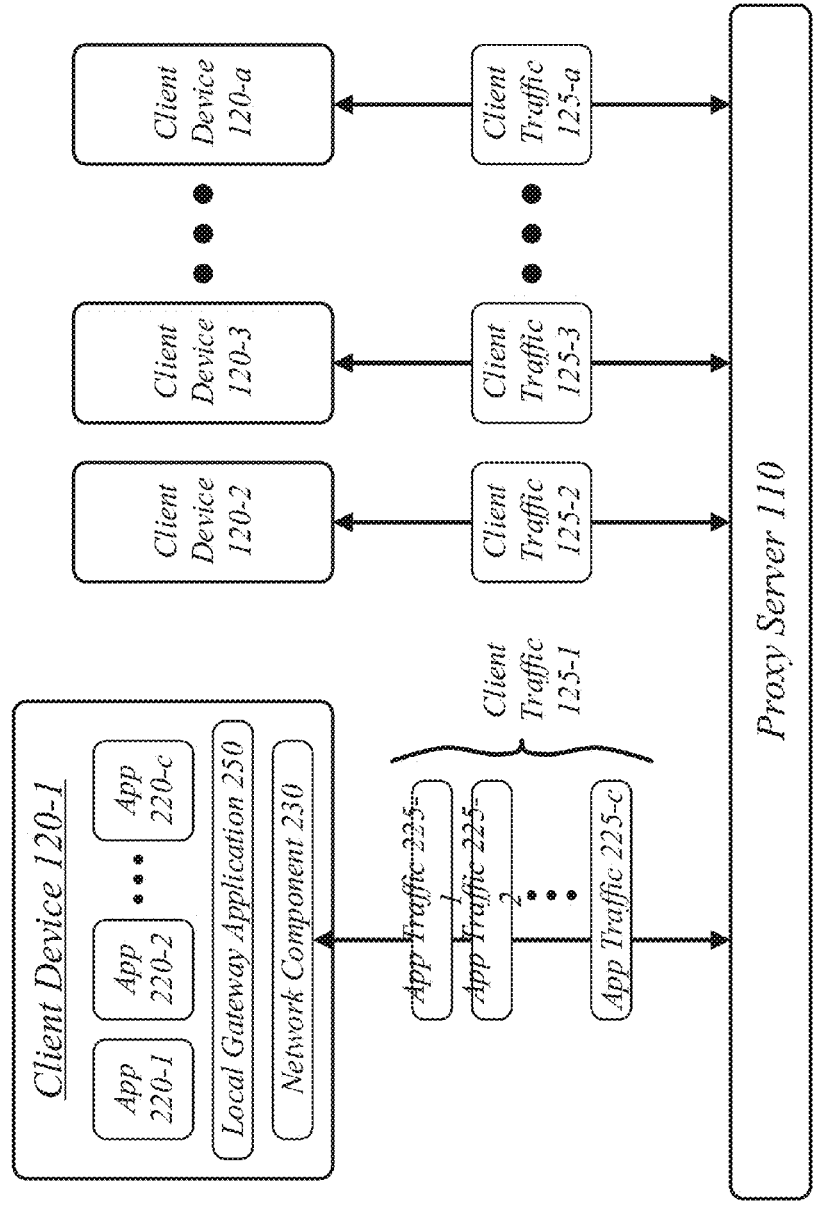
FIG. 2 illustrates an embodiment of a client device running multiple apps that engage in network activity.

FIG. 2 illustrates a block diagram of a particular client device 120-1 running multiple apps 220 that engage in network activity with the proxy server 110. As shown in FIG. 2, the client traffic 125 for the client devices 120 may be generated by one or more apps running on the client devices 120.

The client devices 120 may support and run one or more apps. For instance, client device 120-1 may store and run apps 220, with apps 220 producing and receiving network traffic. Apps 220 may include applications associated with particular services (e.g., social networking applications, video player applications, music streaming applications), standalone web browser, and any other category of application. Apps 220 may produce and receive network traffic while both foregrounded and backgrounded. Each app may exchange network traffic specific to it, such as app 220-1 exchanging app traffic 225-1, app 220-2 exchanging app traffic 225-2 and so on. App traffic 225 may collectively comprise the client traffic 125-1. Client traffic 125 may be generally comprised of the traffic for various apps running on the client devices 120. Client traffic 125 may also comprise additional traffic not associated with any app, such as network traffic associated with an operating system of the client devices 120.

The app traffic 225 may comprise both foreground app traffic and background app traffic. Foreground app traffic may comprise network traffic generated by an app when the app is in the foreground on a client device. Foreground app traffic may comprise network traffic generated in response to a user's active use of an app. Background app traffic may comprise network traffic generated by an app when the app is in the background on a client device. Background app traffic may comprise network traffic not generated in response to a user's active use of an app. Background app traffic may still include traffic generated in response to a user's actions: for example, background app traffic may include updating a server as to a location of a client device, with the changing location of a device in response to a user's activity, but without that activity being active engagement by the user with the app.

The client devices 120, including client device 120-1, may comprise a network component 230. The network component 230 may be operative to perform network activity on behalf of client device 120-1 including the apps 220, an operating system of client device 120-1, and utilities included with client device 120-1. The network component 230 may include a hardware NIC. For instance, client device 120-1 may include a utility for the downloading of apps from an app repository.

An app repository may host a variety of mobile apps for use by various client devices. An app repository may be associated with a provider of a client device, a provider of an operating system of a client device, or be a third-party app repository. Various client devices may be manufactured by different providers. Client devices manufactured by different providers may, in various embodiments, use the same or different app repositories. The same app may be provided by different app repositories, including where an app is provided with differing implementations for different client devices provided by different manufacturers.

The proxy server 110 may receive app traffic 225 from client device 120-1 and selectively forward traffic from particular applications to server devices 130 and selectively return server traffic 135 from server devices 130 to client devices 120. The selective forwarding of app traffic 225 may be based on whether each of the apps 220 have permission to use the proxy server 110 to receive zero-rating of their network activity.

In some cases, various apps on different client devices may exchange traffic with each other via the proxy server 110 rather than exchanging traffic with a server device. It will be appreciated that any of the monitoring, logging, analysis, and selective forwarding as described with reference to client devices 120 interacting with server devices 130 may also be applied to the client devices 120 interacting with each other, such as may correspond to peer-to-peer or other forms of client-to-client communication.

A local gateway application 250 may be present on client devices 120 to empower the client devices 120 to make use of the proxy server 110 and manage the operation of the client devices 120 and their apps 220 with the proxy server 110. Network traffic of the client devices 120 that is exchanged via the proxy server 110 may be transmitted through the local gateway application 250. Exchanging network traffic via the local gateway application 250 may comprise using a network interface application programming interface (API) generally providing access to networks accessible to the client devices 120. For instance, the client operating system (OS) of the client devices 120 may automatically select a network interface from a plurality of network interfaces according to a priority of the network interfaces. The local gateway application 250 may be the highest-priority network interface of the plurality of network interfaces. The local gateway application 250 may be of a higher priority than a cellular network interface, but be of lower priority other network interfaces (e.g., a Wi-Fi network interface) access to which is not managed by the local gateway application 250. As such, in some cases, the local gateway application 250 and the proxy server 110 may only be used for network traffic, even where zero-rating is permitted, when a Wi-Fi network and other networks of higher priority than the cellular network (and therefore the local gateway application 250) are not available to the client devices 120. In some embodiments, apps 220 using local gateway application 250 may first be registered with the client OS or local gateway application 250 before the local gateway application 250 is a prioritized network interface for the apps 220. Users of client devices 120 may have to opt-in to a privacy policy associated with local gateway application 250 prior to local gateway application 250 being used as a network interface for apps 220.

The local gateway application 250 may further operate as a local application on the client devices 120 to assist the proxy server 110 in the identification of the applications generating client traffic 125, such as by identifying each outgoing network transmission to the proxy server 110 with an application identifier for the apps 220. Each application may be associated with an application identifier. The application identifiers may comprise identifiers assigned by the zero-rating redirection system 100. The application identifiers may comprise standardized names or identifiers used by an app repository in the storage, distribution, and identification of apps. The local gateway application 250 may transmit the application identifier for the applications generating app traffic 225 to the proxy server 110. In some embodiments, application identifiers may be assigned to apps 220 by the zero-rating redirection system 100 that are shorter (e.g., requiring less storage space and transmission bandwidth) than identifiers used by the client OS, an app repository, an application provider, or other third-party entity. The use of shorter identifiers may reduce the bandwidth used in identifying what applications are the originators of app traffic 225.

Figure 3:
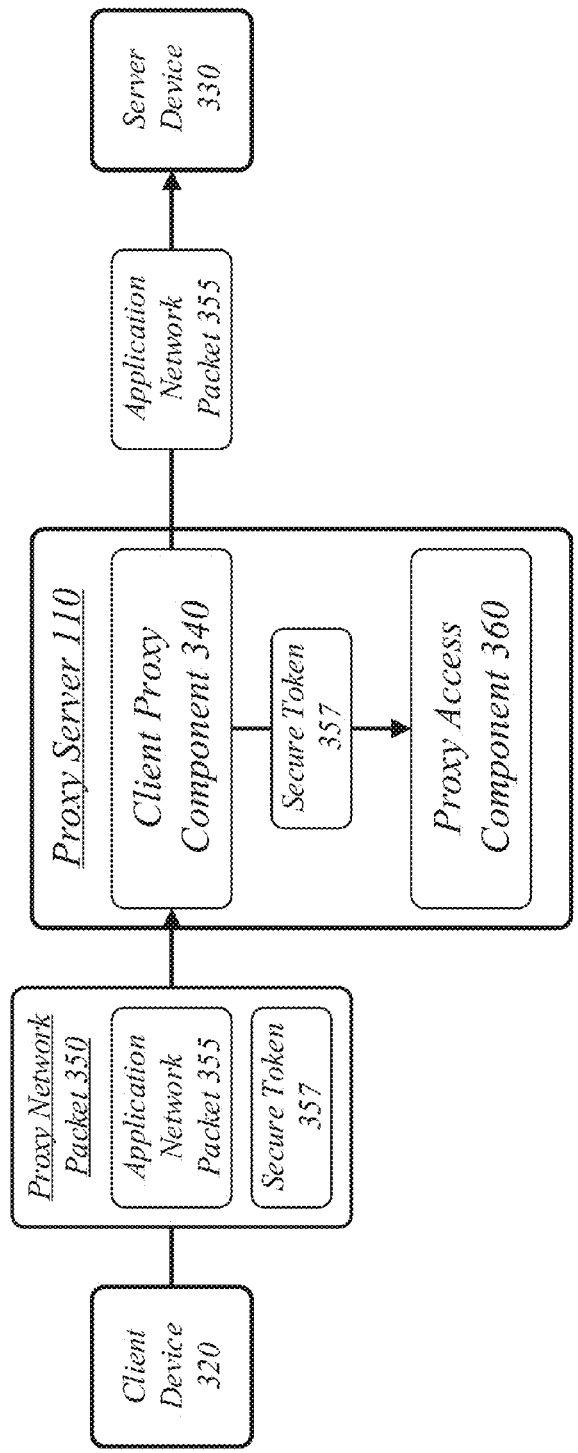
FIG. 3 illustrates the authorization of an application on a client device to use a proxy server and the forwarding of an application network packet to a server device in response to that authorization.

FIG. 3 illustrates the authorization of an application on a client device 320 to use a proxy server 110 and the forwarding of an application network packet 355 to a server device 330 in response to that authorization. The client device 320 may correspond to one of the client devices 120 described with reference to FIG. 1 and FIG. 2. The server device 330 may correspond to one of the server devices 130 described with reference to FIG. 1 and FIG. 2.

The proxy server 110 may comprise a client proxy component 340. The client proxy component 340 may be generally arranged to exchange network traffic with client devices 120 and server devices 130, including client device 320 and server device 330. The client proxy component 340 may receive proxy network packets from client devices, extract application network packets from the proxy network packets, and forward the application network packets to server devices when authorized to do so. The client proxy component 340 may interoperate with a proxy access component 360. The proxy access component 360 may be generally arranged to analyze incoming network traffic and determine whether it is authorized to use the proxy server 110 for forwarding to server devices.

The client proxy component 340 may receive, from a network interface, a proxy network packet 350 from a local gateway application 250 on a client device 320. The proxy network packet 350 may contain an application network packet 355 for delivery to a network server device 330. The application network packet 355 may be generated by a local user application executing on the client device 320. The proxy network packet 350 may comprise the application network packet 355 and a wrapper around the application network packet 355 to encapsulate it for transmission to the proxy server 110. The proxy network packet 350 may include additional data elements, such as, without limitation, a secure token 357.

The client proxy component 340 may forward the application network packet 355 to the network server device 330 based on a determination that a local user application is authorized to use the proxy server 110, the application network packet 355 generated by the local user application. An application network packet 355 may be considered to be generated by the local user application both where the local user application directly generated and requested the transmission of the application network packet 355 and where the local user application directed an external software module responsible for the generation and transmission of the application network packet 355. For example, a local user application may instantiate an external software module such as a video streaming module as part of its operation. In some embodiments, such external software modules, if used as part of the operation of the local user application, may be covered by the authorization of the local user application to use the proxy server 110.

The proxy access component 360 may determine that the application network packet 355 is associated with the local user application on the client device 320. Identifying the local user application may comprise receiving an application identifier from the local gateway application on the client device 320 as part of the wrapper for the proxy network packet 350. Identifying the local user application may comprise performing traffic analysis, packet inspection of the application network packet 355, or other techniques for identifying the originating application for a network packet. The determination of the application network packet 355 being associated with the local user application may be determined based on one or more of process identifier, application identifier, identification of foreground application, application permissions, and destination network address. One or more of these elements may be determined by the local gateway application 250 on the client device 320 and included in the transmission of the proxy network packet 350 to the proxy server 110. Alternatively, one or more of these elements may be determined by the local gateway application 250 on the client device 320 and used by the local gateway application 250 to determine the local user application and to include an identifier for the local user application in the proxy network packet 350.

The proxy access component 360 may determine that the local user application is authorized to use the proxy server 110. The proxy access component 360 may access an authorization repository of authorized local user applications to determine that the local user application is authorized to use the proxy server 110. The authorization repository may store authorization records of which local user applications on which client devices are authorized to use the proxy server 110. The authorization records may indicate a time period, extent of time, cellular network, bandwidth limit, or any other element of an authorization that limit or clarify the extent of a local user application's authorization to use the proxy server 110.

The client device 320 may identify itself to the proxy server 110 using a secure token 357 included in the proxy network packet 350. The secure token 357 may be uniquely associated with the client device 320. The client proxy component 340 may receive the secure token 357 from the client device 330 and forward the secure token 357 to the proxy access component 360. The proxy access component 360 may extract a sequence number from the secure token 357 and determine that the sequence number is a next number in sequence for the secure token 357. The proxy access component 360 may authorize the forwarding of the application network packet 355 to the network server device 330 based on the determination that the sequence number is the next number in sequence for the secure token 357. The use of monotonically increasing sequence numbers may prevent the sharing of the secure token 357 between devices as it may be impractical for multiple client devices to maintain synchronization in generating a monotonically increasing sequence of sequence numbers.

The proxy server 110 may be zero-rated with a mobile data provider, the mobile data provider providing cellular data service for the client device. Authorizing the forwarding of the application network packet 355 to the network server 330 may be based on a determination that the local user application is authorized to use zero-rated data access. The local user application may be authorized to user zero-rated data access based on a data plan record on the proxy server indicating the association of a zero-rated application data plan for the local user application with the client device 320. The authorization records in the authorization repository may comprise, at least in part, data plan records indicating associations between zero-rated application data plan and client devices. The authorization records in the authorization repository may further include a listing of local user applications authorized to use the proxy server 110 for all client devices serviced by a mobile data provider. For example, an entity may contract with a mobile data provider to authorize any of the users of the mobile data provider to access their service using an application provided by the entity. In some cases, such an application may be a limited version of the application for access to a service so as to preview the service and entice the user to upgrade to a more expensive application data plan for access to the service.

Figure 4:
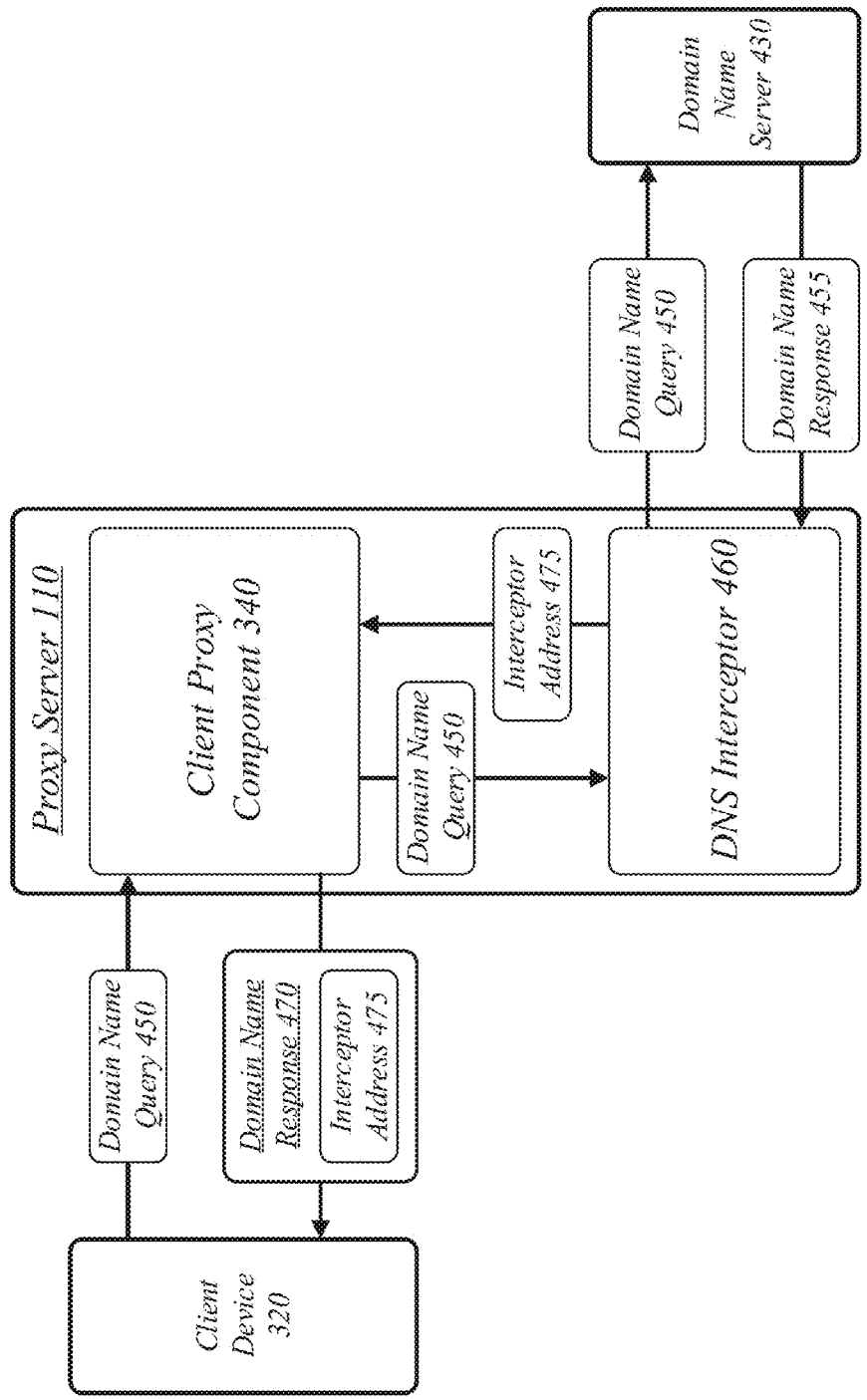
FIG. 4 illustrates the interception of a domain name query by a DNS interceptor and the use of an interceptor address to identify legitimate application activity.

FIG. 4 illustrates the interception of a domain name query by a DNS interceptor 460 and the use of an interceptor address 475 to identify legitimate application activity.

Domain name queries may be used be computer devices to translate from a domain name, a text and often human-understandable network address for a computer or group of computers, to a numerical internet protocol (IP) address. A domain name query is directed to an element of the hierarchical domain name system (DNS). A client device 320 may transmit a domain name query 450 and expect to receive an associated IP address in response and be able to use the received associated IP address to address transmission control protocol (TCP) or user datagram protocol (UDP) packets.

In some cases, the functioning of the zero-rating redirection system 100 may be improved by monitoring and controlling the destination IP addresses on packets transmitted through the proxy server 110. For example, an application on the client device 320 may be associated with a network service, with the network service associated with one or more domain names which are themselves associated with one or more IP addresses. Legitimate activity by the application may include only addressing network packets to the IP addresses received in response to domain name queries on the one or more domain names of the service with which the application is associated. As such, it may be beneficial for the proxy server 110 to prevent any network exchanges by an application with any IP addresses other than those associated with a particular service. This may prevent the user from using the application, or using a separate application to masquerade as the first, to access other services outside the legitimate activity of the application, which some users may attempt to do in order to receive the benefit of zero-rated traffic.

However, it may be computationally expensive for the proxy server to track all of the IP addresses used by a service. It may be comparatively cheaper, both computationally and in terms of time spent by the operator, to register the domain names legitimately associated with a particular application as they may be significantly less subject to change and may be publicized by the provider of the application and/or service with which the application is associated. In contrast, the pool of IPs used by a service may change over time and without notice, in particular as a goal of the domain name system is to relieve users and network operators of tracking and advertising what IP addresses are in use by and associated with various entities.

As such, the zero-rating redirection system 100 may intercept domain name queries and respond to them with a replacement IP address that, instead of being associated with a domain name being queried, is generated by the zero-rating redirection system 100. This replacement IP address may be randomly generated according to any of the known techniques for pseudo-randomness or true-randomness. If this replacement IP address is received by the proxy server 110 as the destination address of an application network packet 355, the proxy server 110 may be assured of knowing that the application using the address selected the address based on the replacement IP address being received in response to an intercepted domain name query. As such, the proxy server 110 may be arranged to intercept domain name queries and response to the domain name queries with replacement interceptor addresses, where the interceptor addresses mark that a DNS interception has taken place and verify that the application is attempting to access an IP address associated with a domain name legitimately associated with the network service for the application. This may serve as proof that the application is performing legitimate network activity, which should therefore be authorized to use the proxy server 110 to receive zero-rated data access (given the application generally being authorized to use the proxy server 110 to receive zero-rated data access, due to, for instance, the existence of a zero-rated data plan for the application).

The client proxy component 340 may be operative to receive a domain name query 450 from the client device 320, the domain name query 450 performed on behalf of the local user application. The client proxy component 340 may recognize that the domain name query 450 is a domain name query. The client proxy component 340 may then forward the domain name query 450 to a DNS interceptor 460.

The DNS interceptor 460 may determine that the domain name query 450 is for a domain name associated with the local user application. The DNS interceptor 460 may perform a domain name lookup based on the domain name to determine a legitimate network address for the network server device 330. This may comprise transmitting the domain name query 450 to a domain name server 430 and receiving a domain name response 455 from the domain name server 430 in response. The DNS interceptor 460 may generate an interceptor address 475. The DNS interceptor 460 may record an interceptor mapping between the interceptor address 475 and the legitimate network address from the domain name response 455 in an interceptor record. The DNS interceptor 460 may return the interceptor address 475 to the client proxy component 340. The client proxy component 340 may then return the interceptor address 475 in a domain name response 470 to the client device 320 in response to the domain name query 450.

Thereafter, the client proxy component 340 may receive a proxy network packet 350 comprising an application network packet 355, the proxy network packet identifying the local user application with which the application network packet 355 is associated. The application network packet may be address to a network address. The DNS interceptor 460 may determine that the network address corresponds to an interceptor address 475, such as due to the use of a particular pattern of prefix on the network address. The DNS interceptor 460 may search an interceptor record using the interceptor address 475 to determine a legitimate network address and an intercepted local application associated with the interceptor address 475, the legitimate network address associated with the network server device 330. The DNS interceptor 460 may determine that the determined local user application corresponds to the determined intercepted local application from the interceptor record. This correspondence may indicate that the application network packet 355 represents legitimate network activity by the local user application as it is directed towards a network address received in response to a domain name query 450 to a domain name associated with the local user application. The client proxy component 340 may therefore forward the application network packet 355 to the network server device 330 at the legitimate network address based on the determination that the determined local user application corresponds to the determined intercepted local application.

An interceptor record may comprise a mapping between interceptor addresses and legitimate network addresses. An interceptor address 475 may be returned to the client device 320 in response to a domain name query performed on behalf of the local user application. The DNS interceptor 460 may determine that the network server device 330 is associated with the local user application based on the receiving of the application network packet addressed to the interceptor address. The DNS interceptor 460 may authorize the forwarding of the application network packet 355 to the network server 330 device based on the determination that the network server device 330 is associated with the local user application.

Figure 5:
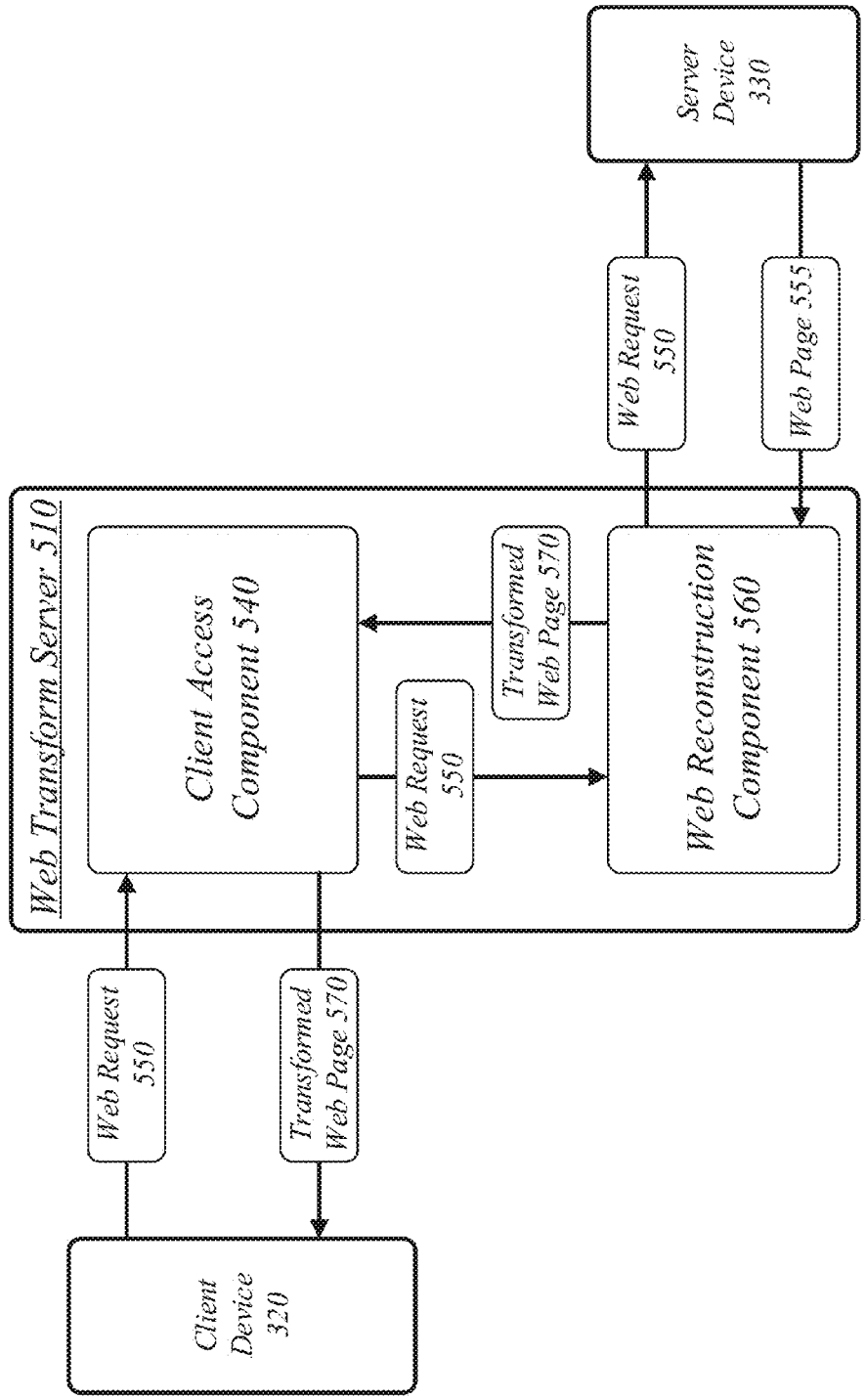
FIG. 5 illustrates responding to a web request with a transformed web page, the transformed web page eliminating references that might cause a web browser on the client device to load non-zero-rated resources.

FIG. 5 illustrates responding to a web request 550 with a transformed web page 570, the transformed web page 570 eliminating references that might cause a web browser on the client device 320 to load non-zero-rated resources.

A web transform server 510 may be generally arranged to host web pages within an assigned range of one or more zero-rated IP addresses. The web transform server 510 may re-host web pages originally or primarily hosted on other web servers, such as on server device 330. Web transform server 510 may be zero-rated with the mobile data provider for a client device 320 while server device 330 is not. As such, retrieving a web page from the web transform server 510 instead of the server device 330 may allow a client device 320 to avoid data access charges when retrieving a web page. The client device 320 may therefore be served a portal web page by the web transform server 510 that includes links to zero-rated versions of web pages that are normally hosted by non-zero-rated servers, with the zero-rated versions hosted by the web transform server 510 and other zero-rated servers.

However, a retrieved web page 555 (e.g., an hypertext markup language (HTML) file) may include references to external content. For example, the web page 555 may include image references, cascading style sheet (CSS) references, and other references to files that must be distinctly requested by the client device 320. As such, even though the base web page 555 may be retrieved from the web transform server 510 instead of the server device 330 due to the use of the zero-rated web portal by the client device 320, a naïve retrieval of the web page 555 may prompt the web browser on the client device 320 to retrieve non-zero-rated resource from the server device 330 or other server devices due to the references to non-zero-rated resources. The client device 320 may therefore benefit from having any references to non-zero-rated resources either removed from the web page 555 or transformed into references to zero-rated versions of the resources.

A client access component 540 may receive a web request 550 from a client device 320, the web request 550 for a web page 555 hosted on a network server device 330. The client access component 540 may transmit a zero-rating transformed web page 570 to the client device 330 in response to the web request 550. The zero-rating transformed web page 570 may comprise an altered version of the web page 555 in which one or more references to non-zero-rated resources are either removed or transformed to references to zero-rated sources for the resources.

A web reconstruction component 560 may retrieve the web page 555 from the network server device 330. The web reconstruction component 560 may identify one or more non-zero-rated resource references in the retrieved web page 555. The web reconstruction component 560 may transform the one or more non-zero-rated resource references to form one or more zero-rated resource references. The web reconstruction component 560 may replace the one or more non-zero-rated resource references with the one or more zero-rated resource references in the web page 555 to form the zero-rating transformed web page 570.

The web request 550 may be addressed to a domain name associated with the web transform server 510. For example, an address of "internet.org" may be associated with the zero-rating redirection system 100 and the one or more zero-rated servers of the zero-rating redirection system 100. A domain name such as "en.wikipedia.org" may be able to be accessed at "en-wikipedia-org.internet.org" or some other translation of an original domain name into a subdomain of the domain name for the zero-rating redirection system 100. The one or more zero-rated resource references may therefore addressed to the domain name associated with the web transform server 510. For example, an image at "upload-.wikimedia.org/wikipedia/commons/2/22/Telmatobius_ventriflavum %2C_Peruvian_Andes.JPG" may be transformed to upload-wikimedia-org.internet.org/wikipedia/commons/2/22/Telmatobius_ventriflavum %2C_Peruvian_Andes-.JPG" wherein the reference to the image is now directed to the domain name for the web transform server 510. This web request 550 may be addressed to a domain name associated a pool of server devices, with the web transform server 510 executing on each server device of the pool of server devices. The pool of server devices may include a web transform server device, wherein the one or more zero-rated resource references are addressed to the domain name associated with the pool of server devices.

In some cases, no zero-rated version may be available for one or more non-zero-rated resources. This may be because a license-holder for the resource does not allow redistribution by the zero-rating redirection system 100. This may be because a mobile data provider providing mobile data access to the client device 320 does not permit the zero-rating redirection system 100 to provide the resources though zero-rated data access. This may be for a variety of other reasons. The web reconstruction component 560 may identify one or more additional non-zero-rated resource references in the retrieved web page 555; determine that a zero-rating mapping record does not specify a zero-rated resource for the one or more additional non-zero-rated resource references; and remove the one or more additional non-zero-rated resource references from the web page 555 in forming the zero-rating transformed web page 570. The zero-rating mapping record may generally provide a mapping between non-zero-rated resources and zero-rated versions of the resources.

Some resources may be able to be provided by the zero-rating redirection system 100 but be of a type that may carry out network data access that is not regulated or transmitted via the zero-rated web transform server 510. For example, an Adobe Flash® file may be able to be hosted by the web transform server 510, but be programmed to carry out network data access that won't necessarily be directed through a zero-rated network address. It may be impossible or impractical for the zero-rating redirection system 100 to determine whether executable media (e.g., media containing an executable program) is programmed to or will be permitted to perform network data access. As such, the web reconstruction component 560 may identify one or more additional resource references in the retrieved web page 555; determine that the additional resource references are of an executable media type; and remove the additional resource references from the web page 555 in forming the zero-rating transformed web page 570.

In some cases, the zero-rating redirection system 100 may degrade or lower the quality of a resource, particularly media resources. For example, a reference to a lower-quality image, sound file, video, or other media element may be used in place of a reference to a media element. The web transform server 510 may host re-encoded media resources for use in replacing original media resources referenced by a web page 555. The web page 555 may reference a first media element at a first quality and the transformed web page 570 reference a second media element at a second quality, with the second quality lower than the first quality. Specifically, an image resource reference may comprise one of the one or more non-zero-rated resource references, the image resource reference indicating an image resource. The web reconstruction component 560 may transform the image resource reference to form a zero-rated image resource reference, the zero-rated image resource reference comprising one of the one or more zero-rated resource references, the zero-rated image resource reference indicating a lower-file-size version of the image resource.

Figure 6:
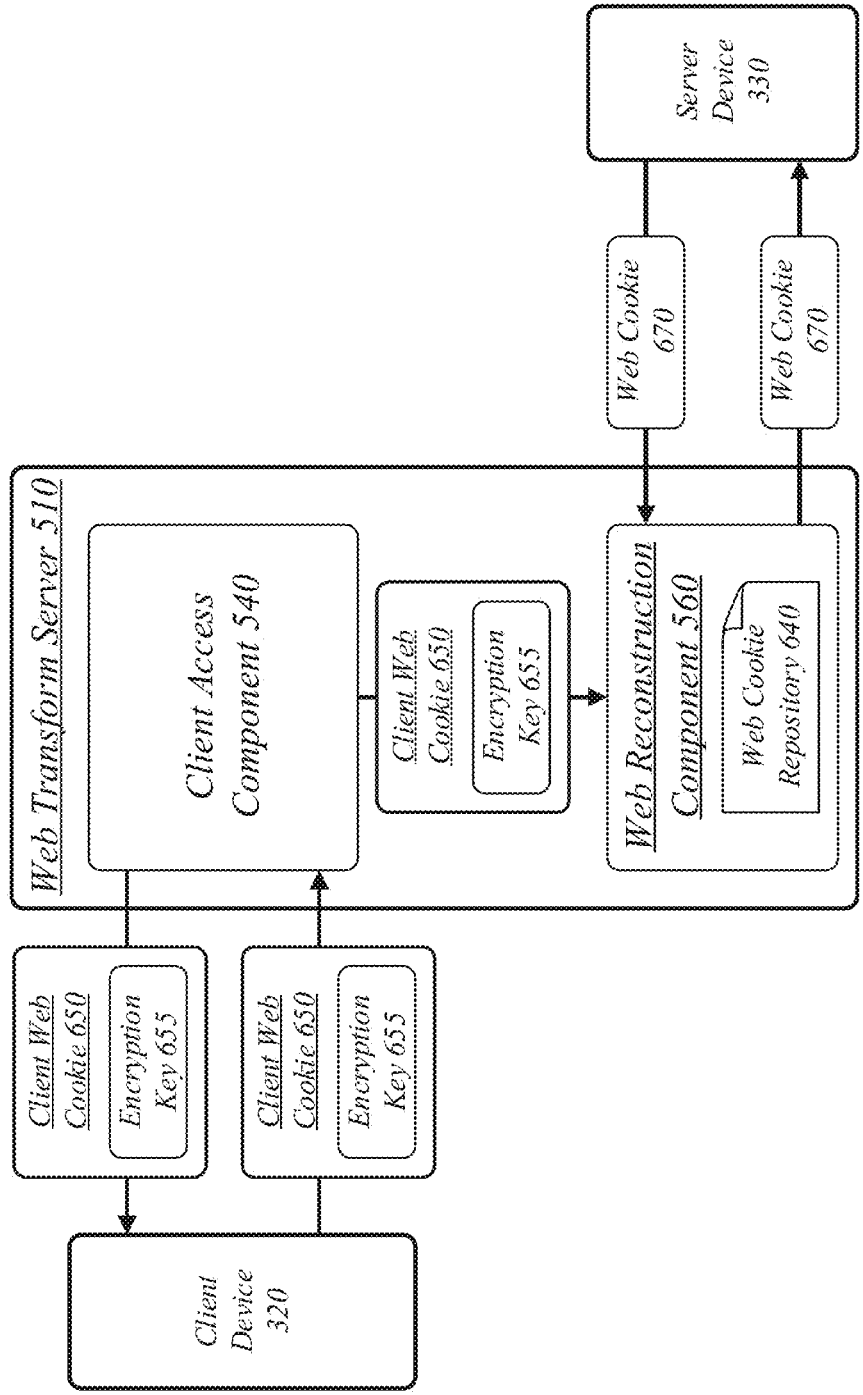
FIG. 6 illustrates the web reconstruction component managing cookies on behalf of the client devices.

FIG. 6 illustrates the web reconstruction component 560 managing cookies on behalf of the client devices 320.

Because using the web transform server 510 may cause access by a client device 320 to web resources hosted across a variety of domain name to be re-hosted at a single domain name, a traditional use of web cookies may risk a comprise of the security of web cookies as maintained by a web browser on the client device 320 as web browsers may use domain names to segregate access to web cookies. As such, a client device 320 may benefit from having web cookies managed by the web transform server 510, with the web transform server 510 implementing domain-name-based web cookie security.

A server device 330 hosting a web page may attempt to store a web cookie 670 on the browser of a client device 320 accessing the server device 330. The web reconstruction component 560 may receive a web cookie 670 from a network server device 330 in association with retrieving a web page 555 from the network server device 330. The web reconstruction component 560 may therefore store the web cookie 670 in a web cookie repository 640 in association with the client device 320, such as in association with a client device identifier for the client device 320. Where multiple web browsers are used on the client device 320, web cookies may further be associated in the web cookie repository 640 with the particular web browser being used on the client device 320 so as to segregate the web cookies for different web browsers in emulation of how the client device 320 itself would segregate the web cookies.

Performing a web request 550 may implicitly or explicitly include the transmission of a web cookie as part of the request. As such, the web reconstruction component 560 may retrieve a web cookie 670 associated with the client device 320 from a web cookie repository 640 and transmit the web cookie 670 to the network server device 330 as part of retrieving the web page 555 from the network server device 330.

However, web cookies may store personal information for a user. As such, it may be beneficial to users of the zero-rating redirection system 100 to empower their client devices to maintain control of access to the user's web cookies. As such, the web cookies for a particular client device 320 may be encrypted according to an encryption key 655 stored on the client device 320 and only temporarily stored in memory on the web transform server 510. The web reconstruction component 560 may generate an encryption key 655 for a client device 320 and store the encryption key 655 in a client web cookie 650 on the client device 320. The web reconstruction component 560 may thereafter be restricted to using the encryption key 655 only when received from the client device 320. It will be appreciated that the web cookie 650 may be individually encrypted using the encryption key 656 or may be encrypted as part of a group of web cookies all associated with the client device 320.

The web reconstruction component 540 may receive a client web cookie 650 from the client device 320 via the client access component 540. The client web cookie 650 may be associated with the domain name for the zero-rating redirection system 100 and be automatically included in any web requests, such as web request 550, to the web transform server 510 by a web browser on the client device 520. The web reconstruction component 560 may extract an encryption key 655 from the client web cookie 650 and decrypt the web cookie 670 used with the server device 330 using the encryption key 655. The web reconstruction component 560 may discard the encryption key 655 from storage on the web transform server 510 after completion of the transaction with the server device 330, which may include the storage of a web cookie 670 in the web cookie repository 640 encrypted using the encryption key 655.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 7 illustrates one embodiment of a first logic flow 700. The logic flow 700 may be representative of some or all of the operations executed by one or more embodiments described herein.

In the illustrated embodiment shown in FIG. 7, the logic flow 700 may receive, at a network interface on a proxy server device, a proxy network packet 350 from a local gateway application 250 on a client device 320, the proxy network packet 350 containing an application network packet 355 for delivery to a network server device 330 at block 702.

The logic flow 700 may determine that the application network packet 355 is associated with a local user application on the client device 320 at block 704.

The logic flow 700 may determine that the local user application is authorized to use the proxy server device at block 706.

The logic flow 700 may determine the application network packet 355 to the network server device 330 based on the determination that the local user application is authorized to use the proxy server device at block 708.

FIG. 8 illustrates one embodiment of a second logic flow 800. The logic flow 800 may be representative of some or all of the operations executed by one or more embodiments described herein.

In the illustrated embodiment shown in FIG. 8, the logic flow 800 may receive, at a network interface on a web transform server device, a web request 550 from a client device 320, the web request 550 for a web page 555 hosted on a network server device 330 at block 802.

The logic flow 800 may retrieve the web page 555 from the network server device 330 at block 804.

The logic flow 800 may identify one or more non-zero-rated resource references in the retrieved web page 555 at block 806.

The logic flow 800 may transform the one or more non-zero-rated resource references to form one or more zero-rated resource references at block 808.

The logic flow 800 may replace the one or more non-zero-rated resource references with the one or more zero-rated resource references in the web page 555 to form a zero-rating transformed web page 570 at block 810.

The logic flow 800 may transmit the zero-rating transformed web page 570 to the client device 320 in response to the web request 550 at block 812.

The embodiments are not limited to these examples.

Figure 9:
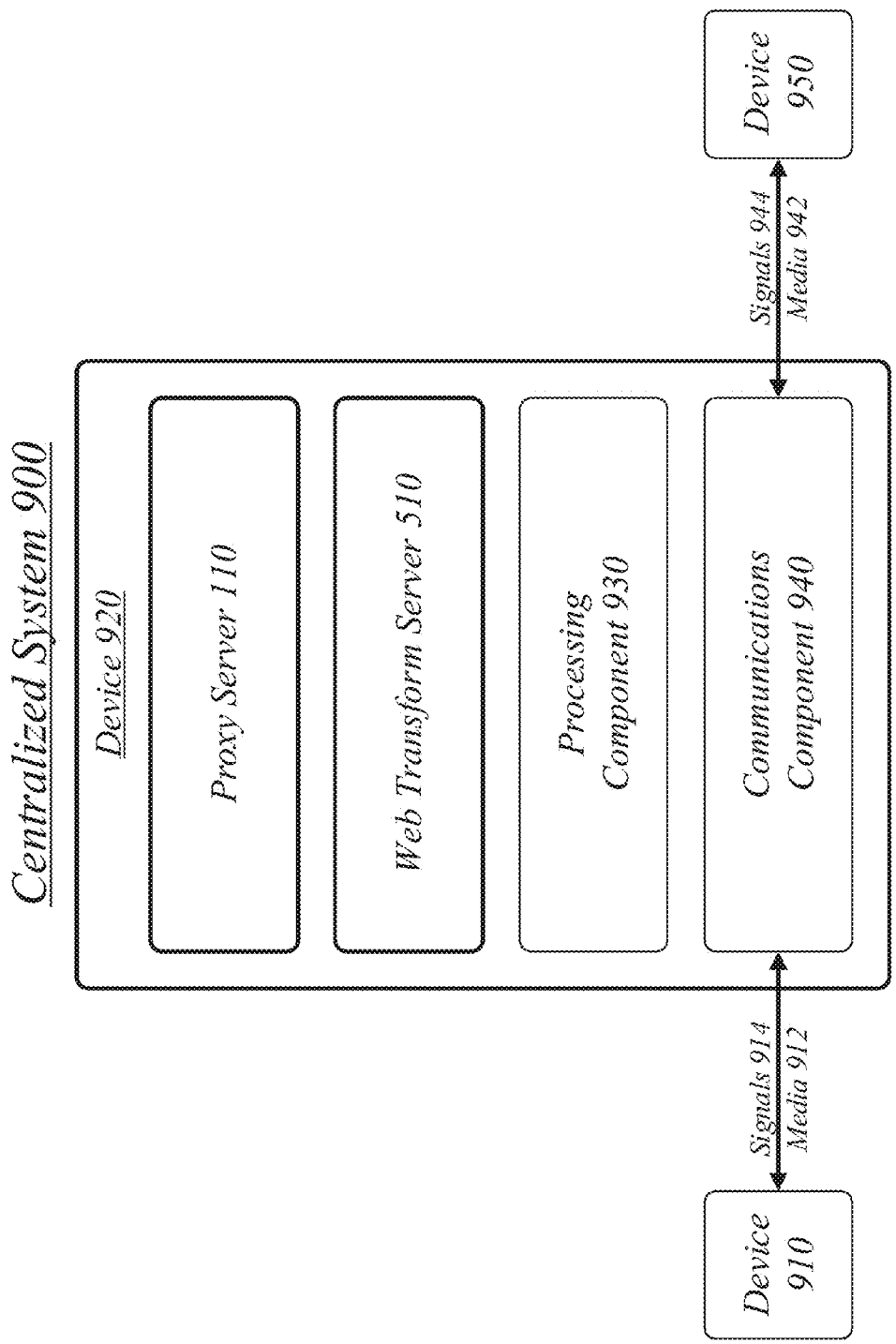
FIG. 9 illustrates an embodiment of a centralized system for the system of FIG. 1.

FIG. 9 illustrates a block diagram of a centralized system 900. The centralized system 900 may implement some or all of the structure and/or operations for the zero-rating redirection system 100 in a single computing entity, such as entirely within a single device 920.

The device 920 may comprise any electronic device capable of receiving, processing, and sending information for the zero-rating redirection system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The device 920 may execute processing operations or logic for the zero-rating redirection system 100 using a processing component 930. The processing component 930 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 920 may execute communications operations or logic for the zero-rating redirection system 100 using communications component 940. The communications component 940 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 940 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 912, 942 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 920 may communicate with other devices 910, 950 over a communications media 912, 942, respectively, using communications signals 914, 944, respectively, via the communications component 940. The devices 910, 950 may be internal or external to the device 920 as desired for a given implementation. The device 920 may implement both the proxy server 110 and the web transform server 510. Device 910 may comprise a client device 320 of the zero-rating redirection system 100. The device 950 may comprise a server device 330.

Figure 10:
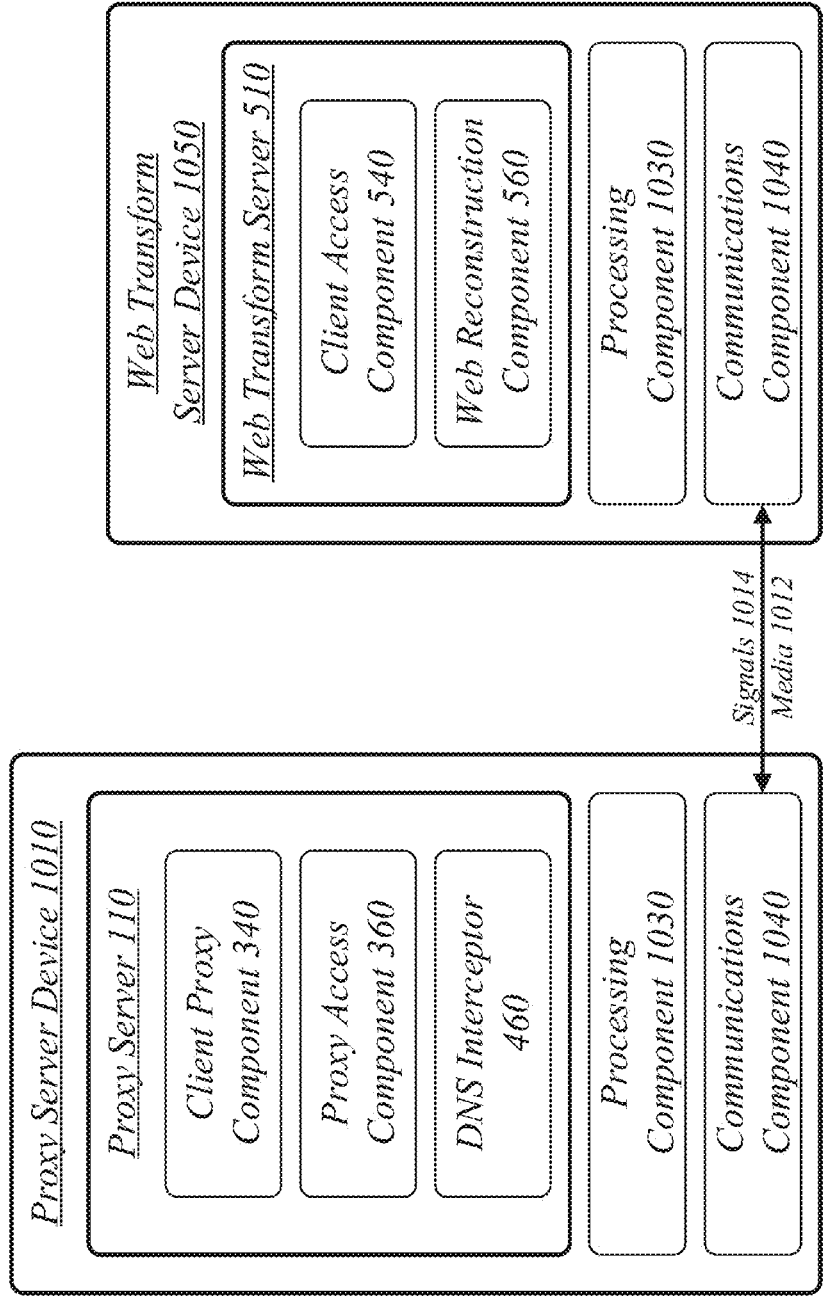
FIG. 10 illustrates an embodiment of a distributed system for the system of FIG. 1.

FIG. 10 illustrates a block diagram of a distributed system 1000. The distributed system 1000 may distribute portions of the structure and/or operations for the zero-rating redirection system 100 across multiple computing entities. Examples of distributed system 1000 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 1000 may comprise a proxy server device 1010 and a web transform server device 1050. In general, the proxy server device 1010 and the web transform server device 1050 may be the same or similar to the client device 920 as described with reference to FIG. 9. For instance, the proxy server device 1010 and the web transform server device 1050 may each comprise a processing component 1030 and a communications component 1040 which are the same or similar to the processing component 930 and the communications component 940, respectively, as described with reference to FIG. 9. In another example, the devices 1010, 1050 may communicate over a communications media 1012 using communications signals 1014 via the communications components 1040.

The proxy server device 1010 may comprise or employ one or more client programs that operate to perform various methodologies in accordance with the described embodiments. In one embodiment, for example, the proxy server device 1010 may implement the proxy server 110. The web transform server device 1050 may comprise or employ one or more server programs that operate to perform various methodologies in accordance with the described embodiments. In one embodiment, for example, the web transform server device 1050 may implement the web transform server 510. It will be appreciated that, in some embodiments, multiple proxy server devices and/or multiple web transform server devices may be used. In some embodiments, multiple server devices may be used with each server device operative to function as both a proxy server and a web transform server. In some embodiments, various components, such as a the client access component 540 and web reconstruction component 560, may be distributed across different devices. In general, any arrangement of servers and components may be used and distributed across different or the same server devices.

Figure 11:
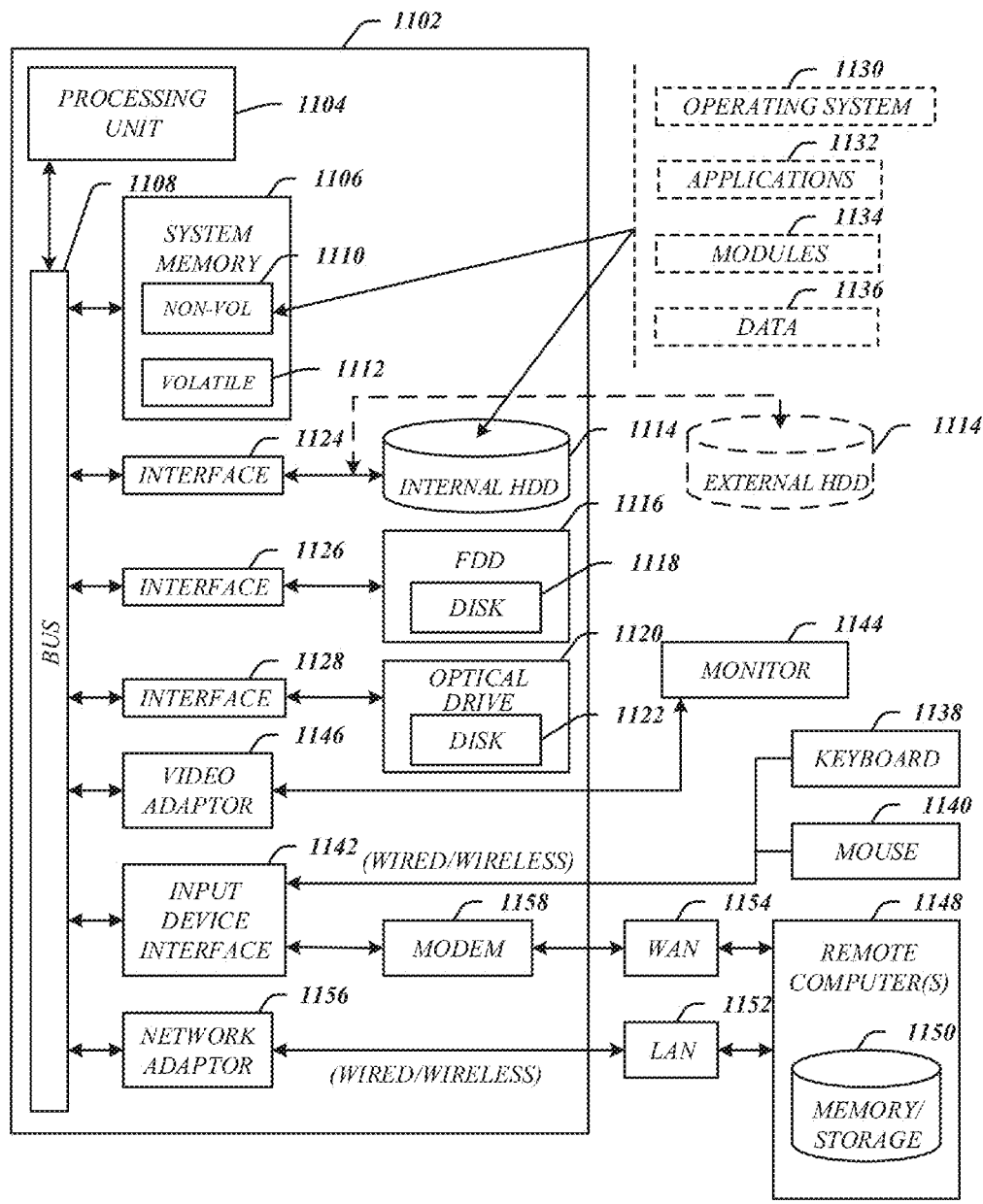
FIG. 11 illustrates an embodiment of a computing architecture.

FIG. 11 illustrates an embodiment of an exemplary computing architecture 1100 suitable for implementing various embodiments as previously described. In one embodiment, the computing architecture 1100 may comprise or be implemented as part of an electronic device. Examples of an electronic device may include those described with reference to FIG. 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1100. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1100 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1100.

As shown in FIG. 11, the computing architecture 1100 comprises a processing unit 1104, a system memory 1106 and a system bus 1108. The processing unit 1104 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1104.

The system bus 1108 provides an interface for system components including, but not limited to, the system memory 1106 to the processing unit 1104. The system bus 1108 can be any of several types of bus structure that may further interconnect to a memory bus (with or without a memory controller), a peripheral bus, and a local bus using any of a variety of commercially available bus architectures. Interface adapters may connect to the system bus 1108 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1100 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1106 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 11, the system memory 1106 can include non-volatile memory 1110 and/or volatile memory 1112. A basic input/output system (BIOS) can be stored in the non-volatile memory 1110.

The computer 1102 may include various types of computer-readable storage media in the form of one or more lower speed memory units, including an internal (or external) hard disk drive (HDD) 1114, a magnetic floppy disk drive (FDD) 1116 to read from or write to a removable magnetic disk 1118, and an optical disk drive 1120 to read from or write to a removable optical disk 1122 (e.g., a CD-ROM or DVD). The HDD 1114, FDD 1116 and optical disk drive 1120 can be connected to the system bus 1108 by a HDD interface 1124, an FDD interface 1126 and an optical drive interface 1128, respectively. The HDD interface 1124 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1110, 1112, including an operating system 1130, one or more application programs 1132, other program modules 1134, and program data 1136. In one embodiment, the one or more application programs 1132, other program modules 1134, and program data 1136 can include, for example, the various applications and/or components of the zero-rating redirection system 100.

A user can enter commands and information into the computer 1102 through one or more wire/wireless input devices, for example, a keyboard 1138 and a pointing device, such as a mouse 1140. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1104 through an input device interface 1142 that is coupled to the system bus 1108, but can be connected by other interfaces such as a parallel port, IEEE 1394 serial port, a game port, a USB port, an IR interface, and so forth.

A monitor 1144 or other type of display device is also connected to the system bus 1108 via an interface, such as a video adaptor 1146. The monitor 1144 may be internal or external to the computer 1102. In addition to the monitor 1144, a computer typically includes other peripheral output devices, such as speakers, printers, and so forth.

The computer 1102 may operate in a networked environment using logical connections via wire and/or wireless communications to one or more remote computers, such as a remote computer 1148. The remote computer 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wire/wireless connectivity to a local area network (LAN) 1152 and/or larger networks, for example, a wide area network (WAN) 1154. Such LAN and WAN networking environments are commonplace in offices and companies, and facilitate enterprise-wide computer networks, such as intranets, all of which may connect to a global communications network, for example, the Internet.

When used in a LAN networking environment, the computer 1102 is connected to the LAN 1152 through a wire and/or wireless communication network interface or adaptor 1156. The adaptor 1156 can facilitate wire and/or wireless communications to the LAN 1152, which may also include a wireless access point disposed thereon for communicating with the wireless functionality of the adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wire and/or wireless device, connects to the system bus 1108 via the input device interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 12:
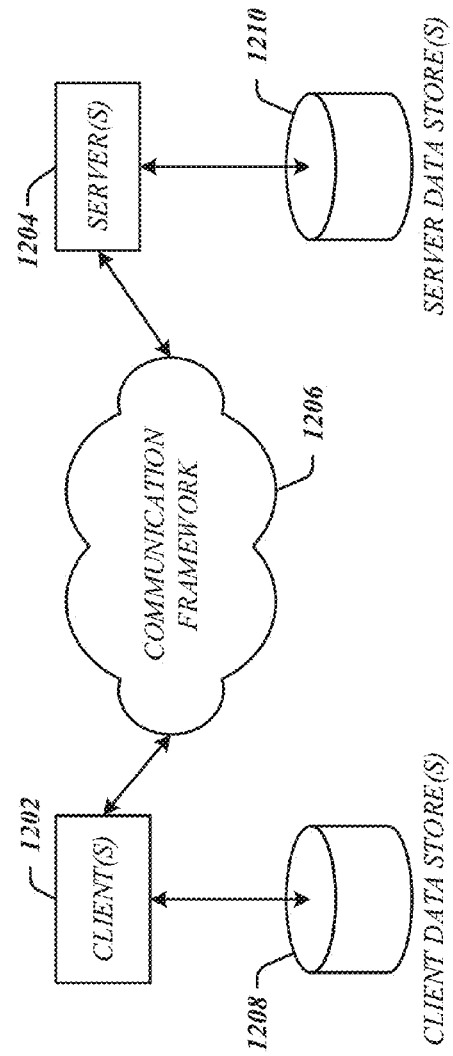
FIG. 12 illustrates an embodiment of a communications architecture.

FIG. 12 illustrates a block diagram of an exemplary communications architecture 1200 suitable for implementing various embodiments as previously described. The communications architecture 1200 includes various common communications elements, such as a transmitter, receiver, transceiver, radio, network interface, baseband processor, antenna, amplifiers, filters, power supplies, and so forth. The embodiments, however, are not limited to implementation by the communications architecture 1200.

As shown in FIG. 12, the communications architecture 1200 comprises includes one or more clients 1202 and servers 1204. The clients 1202 may implement the client device 910. The servers 1204 may implement the server device 950. The clients 1202 and the servers 1204 are operatively connected to one or more respective client data stores 1208 and server data stores 1210 that can be employed to store information local to the respective clients 1202 and servers 1204, such as cookies and/or associated contextual information.

The clients 1202 and the servers 1204 may communicate information between each other using a communication framework 1206. The communications framework 1206 may implement any well-known communications techniques and protocols. The communications framework 1206 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1206 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1202 and the servers 1204. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 13:
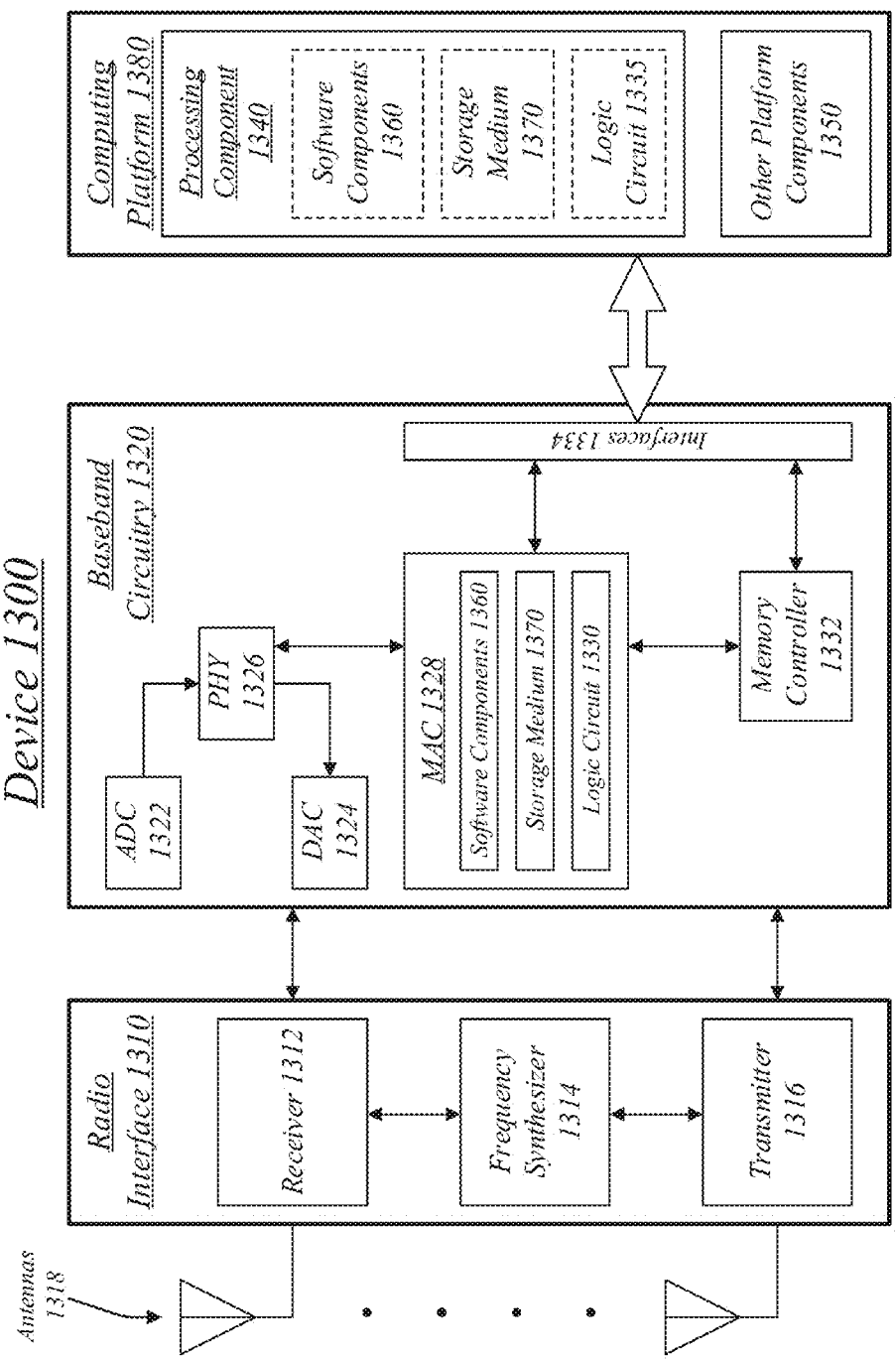
FIG. 13 illustrates an embodiment of a radio device architecture.

FIG. 13 illustrates an embodiment of a device 1300 for use in a multicarrier OFDM system, such as the zero-rating redirection system 100. Device 1300 may implement, for example, software components 1360 as described with reference to zero-rating redirection system 100 and/or a logic circuit 1330. The logic circuit 1330 may include physical circuits to perform operations described for the zero-rating redirection system 100. As shown in FIG. 13, device 1300 may include a radio interface 1310, baseband circuitry 1320, and computing platform 1380, although embodiments are not limited to this configuration.

The device 1300 may implement some or all of the structure and/or operations for the zero-rating redirection system 100 and/or logic circuit 1330 in a single computing entity, such as entirely within a single device. Alternatively, the device 1300 may distribute portions of the structure and/or operations for the zero-rating redirection system 100 and/or logic circuit 1330 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1310 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1310 may include, for example, a receiver 1312, a transmitter 1316 and/or a frequency synthesizer 1314. Radio interface 1310 may include bias controls, a crystal oscillator and/or one or more antennas 1318. In another embodiment, radio interface 1310 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1320 may communicate with radio interface 1310 to process receive and/or transmit signals and may include, for example, an analog-to-digital converter 1322 for down converting received signals, a digital-to-analog converter 1324 for up converting signals for transmission. Further, baseband circuitry 1320 may include a baseband or physical layer (PHY) processing circuit 1326 for PHY link layer processing of respective receive/transmit signals. Baseband circuitry 1320 may include, for example, a processing circuit 1328 for medium access control (MAC)/data link layer processing having a storage medium 1370. Baseband circuitry 1320 may include a memory controller 1332 for communicating with processing circuit 1328 and/or a computing platform 1380, for example, via one or more interfaces 1334.

In some embodiments, PHY processing circuit 1326 may include a frame construction and/or detection module, in combination with additional circuitry such as a buffer memory, to construct and/or deconstruct communication frames, such as radio frames. Alternatively or in addition, MAC processing circuit 1328 may share processing for certain of these functions or perform these processes independent of PHY processing circuit 1326. In some embodiments, MAC and PHY processing may be integrated into a single circuit.

The computing platform 1380 may provide computing functionality for the device 1300. As shown, the computing platform 1380 may include a processing component 1340. In addition to, or alternatively of, the baseband circuitry 1320, the device 1300 may execute processing operations or logic for the zero-rating redirection system 100 and logic circuit 1330 using the processing component 1340. The processing component 1340 (and/or PHY 1326 and/or MAC 1328) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1380 may further include other platform components 1350. Other platform components 1350 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1300 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 1300 described herein, may be included or omitted in various embodiments of device 1300, as suitably desired. In some embodiments, device 1300 may be configured to be compatible with protocols and frequencies associated one or more of the 3GPP LTE Specifications and/or IEEE 802.16 Standards for WMANs, and/or other broadband wireless networks, cited herein, although the embodiments are not limited in this respect.

Embodiments of device 1300 may be implemented using single input single output (SISO) architectures. However, certain implementations may include multiple antennas (e.g., antennas 1318) for transmission and/or reception using adaptive antenna techniques for beamforming or spatial division multiple access (SDMA) and/or using MIMO communication techniques.

The components and features of device 1300 may be implemented using any combination of discrete circuitry, application specific integrated circuits (ASICs), logic gates and/or single chip architectures. Further, the features of device 1300 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1300 shown in the block diagram of FIG. 13 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

A computer-implemented method may comprise receiving, at a network interface on a server device, a network request; and performing a zero-rated network transaction in response to the network request.

An apparatus may comprise a processor circuit on a server device; a network interface on the server device; a component operative on the processor circuit to receive, from the network interface, a network request and perform a zero-rated network transaction in response to the network request. The apparatus may be operative to implement any of the computer-implemented methods described herein.

A computer-implemented method may comprise receiving, at a network interface on a proxy server device, a proxy network packet from a local gateway application on a client device, the proxy network packet containing an application network packet for delivery to a network server device; determining that the application network packet is associated with a local user application on the client device; determining that the local user application is authorized to use the proxy server device; and forwarding the application network packet to the network server device based on the determination that the local user application is authorized to use the proxy server device.

A computer-implemented method may further comprise the application network packet addressed to a network address, further comprising; determining that the network address corresponds to an interceptor address; searching an interceptor record using the interceptor address to determine a legitimate network address and an intercepted local application associated with the interceptor address, the legitimate network address associated with the network server device; determining that the determined local user application corresponds to the determined intercepted local application; and forwarding the application network packet to the network server device at the legitimate network address based on the determination that the determined local user application corresponds to the determined intercepted local application.

A computer-implemented method may further comprise the interceptor record comprising a mapping between interceptor addresses and legitimate network addresses, the interceptor address returned to the client device in response to a domain name query performed on behalf of the local user application, further comprising: determining that the network server device is associated with the local user application based on the receiving of the application network packet addressed to the interceptor address; and authorizing the forwarding of the application network packet to the network server device based on the determination that the network server device is associated with the local user application.

A computer-implemented method may further comprise receiving a domain name query from the client device, the domain name query performed on behalf of the local user application; determining that the domain name query is for a domain name associated with the local user application; performing a domain name lookup based on the domain name to determine a legitimate network address for the network server device; generating an interceptor address; recording an interceptor mapping between the interceptor address and the legitimate network address in an interceptor record; and returning the interceptor address to the client device in response to the domain name query.

A computer-implemented method may further comprise the proxy server device zero-rated with a mobile data provider for the client device, further comprising: authorizing the forwarding of the application network packet to the network server device based on a determination that the local user application is authorized to use zero-rated data access.

A computer-implemented method may further comprise the local user application authorized to user zero-rated data access based on a data plan record on the proxy server indicating the association of a zero-rated application data plan for the local user application with the client device.

A computer-implemented method may further comprise receiving a secure token from the client device, the secure token uniquely associated with the client device; extracting a sequence number from the secure token; determine that the sequence number is a next number in sequence for the secure token; and authorizing the forwarding of the application network packet to the network server device based on the determination that the sequence number is the next number in sequence for the secure token.

A computer-implemented method may further comprise the determination of the application network packet being associated with the local user application determined based on one or more of process identifier, application identifier, identification of foreground application, application permissions, and destination network address.

An apparatus may comprise a processor circuit on a proxy server device; a network interface on the proxy server device; a client proxy component operative on the processor circuit to receive, from the network interface, a proxy network packet from a local gateway application on a client device, the proxy network packet containing an application network packet for delivery to a network server device; and forward the application network packet to the network server device based on a determination that a local user application is authorized to use the proxy server device; and a proxy access component operative on the processor circuit to determine that the application network packet is associated with the local user application on the client device; and determine that the local user application is authorized to use the proxy server device. The apparatus may be operative to implement any of the computer-implemented methods described herein.

A computer-implemented method may comprise receiving, at a network interface on a web transform server device, a web request from a client device, the web request for a web page hosted on a network server device; retrieving the web page from the network server device; identifying one or more non-zero-rated resource references in the retrieved web page; transforming the one or more non-zero-rated resource references to form one or more zero-rated resource references; replacing the one or more non-zero-rated resource references with the one or more zero-rated resource references in the web page to form a zero-rating transformed web page; and transmitting the zero-rating transformed web page to the client device in response to the web request.

A computer-implemented method may further comprise the web request addressed to a domain name associated with the web transform server device, the one or more zero-rated resource references addressed to the domain name associated with the web transform server device.

A computer-implemented method may further comprise the web request addressed to a domain name associated a pool of server devices, the pool of server devices including the web transform server device, the one or more zero-rated resource references addressed to the domain name associated with the pool of server devices.

A computer-implemented method may further comprise retrieving a web cookie associated with the client device from a web cookie repository; transmitting the web cookie to the network server device as part of retrieving the web page from the network server device.

A computer-implemented method may further comprise receiving a client web cookie from the client device; extracting an encryption key from the client web cookie; and decrypting the web cookie using the encryption key.

A computer-implemented method may further comprise receiving a web cookie from the network server device in association with retrieving the web page from the network server device; and storing the web cookie in a web cookie repository in association with the client device.

A computer-implemented method may further comprise identifying one or more additional non-zero-rated resource references in the retrieved web page; determining that a zero-rating mapping record does not specify a zero-rated resource for the one or more additional non-zero-rated resource references; and removing the one or more additional non-zero-rated resource references from the web page in forming the zero-rating transformed web page.

A computer-implemented method may further comprise identifying one or more additional resource references in the retrieved web page; determining that the additional resource references are of an executable media type; and removing the additional resource references from the web page in forming the zero-rating transformed web page.

A computer-implemented method may further comprise an image resource reference comprising one of the one or more non-zero-rated resource references, the image resource reference indicating an image resource, further comprising: transforming the image resource reference to form a zero-rated image resource reference, the zero-rated image resource reference comprising one of the one or more zero-rated resource references, the zero-rated image resource reference indicating a lower-file-size version of the image resource.

An apparatus may comprise a processor circuit on a web transform server device; a network interface on the web transform server device; a client access component operative on the processor circuit to receive, from the network interface, a web request from a client device, the web request for a web page hosted on a network server device; and transmit a zero-rating transformed web page to the client device in response to the web request; and a web reconstruction component operative on the processor circuit to retrieve the web page from the network server device; identify one or more non-zero-rated resource references in the retrieved web page; transform the one or more non-zero-rated resource references to form one or more zero-rated resource references; and replace the one or more non-zero-rated resource references with the one or more zero-rated resource references in the web page to form the zero-rating transformed web page. The apparatus may be operative to implement any of the computer-implemented methods described herein.

At least one computer-readable storage medium may comprise instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A computer-implemented method, comprising: receiving, at a network interface on a proxy server device, a proxy network packet from a local gateway application on a client device, the proxy network packet containing an application network packet for delivery to a network server device; determining that the application network packet is associated with a local user application capable of execution on the client device; determining that the local user application is authorized to use the proxy server device; and forwarding the application network packet to the network server device based on the determination that the local user application is authorized to use the proxy server device, the application network packet addressed to a network address, further comprising; determining that the network address corresponds to an interceptor address that is distinct from a legitimate network address associated with the network server device: searching an interceptor record using the interceptor address to determine the legitimate network address and an intercepted local application associated with the interceptor address, determining that the determined local user application corresponds to the determined intercepted local application; and forwarding the application network packet to the network server device at the legitimate network address based on the determination that the determined local user application corresponds to the determined intercepted local application.

2. The method of claim 1, the interceptor record comprising a mapping between interceptor addresses and legitimate network addresses, the interceptor address returned to the client device in response to a domain name query performed on behalf of the local user application, further comprising: determining that the network server device is associated with the local user application based on the receiving of the application network packet addressed to the interceptor address; and authorizing the forwarding of the application network packet to the network server device based on the determination that the network server device is associated with the local user application.

3. The method of claim 1, further comprising:
  receiving a domain name query from the client device, the domain name query performed on behalf of the local user application;
  determining that the domain name query is for a domain name associated with the local user application;
  performing a domain name lookup based on the domain name to determine a legitimate network address for the network server device;
  generating an interceptor address;
  recording an interceptor mapping between the interceptor address and the legitimate network address in an interceptor record; and
  returning the interceptor address to the client device in response to the domain name query.

4. The method of claim 1, the proxy server device zero-rated with a mobile data provider for the client device, further comprising:
  authorizing the forwarding of the application network packet to the network server device based on a determination that the local user application is authorized to use zero-rated data access.

5. The method of claim 4, the local user application authorized to user zero-rated data access based on a data plan record on the proxy server indicating the association of a zero-rated application data plan for the local user application with the client device.

6. The method of claim 1, further comprising:
  receiving a secure token from the client device, the secure token uniquely associated with the client device;
  extracting a sequence number from the secure token;
  determine that the sequence number is a next number in sequence for the secure token; and
  authorizing the forwarding of the application network packet to the network server device based on the determination that the sequence number is the next number in sequence for the secure token.

7. The method of claim 1, the determination of the application network packet being associated with the local user application determined based on one or more of process identifier, application identifier, identification of foreground application, application permissions, and destination network address.

8. An apparatus, comprising: a processor circuit on a proxy server device; a network interface on the proxy server device; a client proxy component operative on the processor circuit to receive, from the network interface, a proxy network packet from a local gateway application on a client device, the proxy network packet containing an application network packet for delivery to a network server device; and forward the application network packet to the network server device based on a determination that a local user application associated with the application network packet and capable of execution on the client device is authorized to use the proxy server device; and a proxy access component operative on the processor circuit to determine that the application network packet is associated with the local user application on the client device; and determine that the local user application is authorized to use the proxy server device, the application network packet addressed to a network address, further comprising; a DNS interceptor operative on the processor circuit to determine that the network address corresponds to an interceptor address that is distinct from a legitimate network address associated with the network server device: search an interceptor record using the interceptor address to determine the legitimate network address and an intercepted local application associated with the interceptor address, the legitimate network address associated with the network server device; determine that the determined local user application corresponds to the determined intercepted local application; and the client proxy component operative on the processor circuit to forward the application network packet to the network server device at the legitimate network address based on the determination that the determined local user application corresponds to the determined intercepted local application.

9. The apparatus of claim 8, the interceptor record comprising a mapping between interceptor addresses and legitimate network addresses, the interceptor address returned to the client device in response to a domain name query performed on behalf of the local user application, the proxy access component further operative to determine that the network server device is associated with the local user application based on the receiving of the application network packet addressed to the interceptor address and authorize the forwarding of the application network packet to the network server device based on the determination that the network server device is associated with the local user application.

10. The apparatus of claim 8, further comprising:
  the client proxy component further operative to receive a domain name query from the client device, the domain name query performed on behalf of the local user application; and return and interceptor address to the client device in response to the domain name query; and
  a DNS interceptor operative to determine that the domain name query is for a domain name associated with the local user application; perform a domain name lookup based on the domain name to determine a legitimate network address for the network server device; generate an interceptor address; and record an interceptor mapping between the interceptor address and the legitimate network address in an interceptor record.

11. The apparatus of claim 8, the proxy server device zero-rated with a mobile data provider for the client device, the proxy access component further operative to authorize the forwarding of the application network packet to the network server device based on a determination that the local user application is authorized to use zero-rated data access.

12. The apparatus of claim 8, further comprising, the local user application authorized to user zero-rated data access based on a data plan record on the proxy server indicating the association of a zero-rated application data plan for the local user application with the client device.

13. At least one non-transitory computer-readable storage medium comprising instructions that, when executed, cause a system to: receive, at a network interface on a proxy server device, a proxy network packet from a local gateway application on a client device, the proxy network packet containing an application network packet for delivery to a network server device; determine that the application network packet is associated with a local user application capable of execution on the client device; determine that the local user application is authorized to use the proxy server device; and determine the application network packet to the network server device based on the determination that the local user application is authorized to use the proxy server device, the application network packet addressed to a network address, comprising further instructions that, when executed, cause a system to: determine that the network address corresponds to an interceptor address that is distinct from a legitimate network address associated with the network server device: search an interceptor record using the interceptor address to determine the legitimate network address and an intercepted local application associated with the interceptor address, the legitimate network address associated with the network server device; determine that the determined local user application corresponds to the determined intercepted local application; and forward the application network packet to the network server device at the legitimate network address based on the determination that the determined local user application corresponds to the determined intercepted local application.

14. The computer-readable storage medium of claim 13, the interceptor record comprising a mapping between interceptor addresses and legitimate network addresses, the interceptor address returned to the client device in response to a domain name query performed on behalf of the local user application, comprising further instructions that, when executed, cause a system to: determine that the network server device is associated with the local user application based on the receiving of the application network packet addressed to the interceptor address; and authorize the forwarding of the application network packet to the network server device based on the determination that the network server device is associated with the local user application.

15. The computer-readable storage medium of claim 13, comprising further instructions that, when executed, cause a system to:
receive a domain name query from the client device, the domain name query performed on behalf of the local user application;
determine that the domain name query is for a domain name associated with the local user application;
perform a domain name lookup based on the domain name to determine a legitimate network address for the network server device;
generate an interceptor address;
record an interceptor mapping between the interceptor address and the legitimate network address in an interceptor record; and
return the interceptor address to the client device in response to the domain name query.

16. The computer-readable storage medium of claim 13, the proxy server device zero-rated with a mobile data provider for the client device, comprising further instructions that, when executed, cause a system to:
authorize the forwarding of the application network packet to the network server device based on a determination that the local user application is authorized to use zero-rated data access.

17. The computer-readable storage medium of claim 13, the local user application authorized to user zero-rated data access based on a data plan record on the proxy server indicating the association of a zero-rated application data plan for the local user application with the client device.

* * * * *

UNITED STATES PATENT AND TRADEMARK OFFICE
CERTIFICATE OF CORRECTION

PATENT NO. : 9,769,323 B2  
APPLICATION NO. : 14/707891  
DATED : September 19, 2017  
INVENTOR(S) : Lior Tubi et al.

It is certified that error appears in the above-identified patent and that said Letters Patent is hereby corrected as shown below:

On the Title Page

Item (72) Inventors: replace "Dekel Schmuel Naar" with Dekel Shmuel Naar

Signed and Sealed this
Seventeenth Day of July, 2018

Andrei Iancu
*Director of the United States Patent and Trademark Office*